(12) United States Patent
Pratt et al.

(10) Patent No.: US 8,322,015 B2
(45) Date of Patent: Dec. 4, 2012

(54) FLUSH-MOUNT, BLIND FASTENER

(75) Inventors: John D. Pratt, Laguna Niguel, CA (US); Emory K. Tamashiro, San Pedro, CA (US)

(73) Assignee: Monogram Aerospace Fasteners, Inc., Los Angeles, CA (US)

( * ) Notice: Subject to any disclaimer, the term of this patent is extended or adjusted under 35 U.S.C. 154(b) by 0 days.

(21) Appl. No.: 12/888,852

(22) Filed: Sep. 23, 2010

(65) Prior Publication Data

US 2011/0010919 A1    Jan. 20, 2011

Related U.S. Application Data

(63) Continuation of application No. PCT/US2009/039083, filed on Apr. 1, 2009.

(60) Provisional application No. 61/041,739, filed on Apr. 2, 2008.

(51) Int. Cl.
*B23P 11/00* (2006.01)
*F16B 39/284* (2006.01)
(52) U.S. Cl. .................... 29/525.01; 411/132
(58) Field of Classification Search ............ 29/525.01, 29/525.02, 525.05, 525.06, 525.08, 428, 29/34 B, 715, 787, 243.53; 411/132
See application file for complete search history.

(56) References Cited

U.S. PATENT DOCUMENTS

| | | |
|---|---|---|
| 4,579,491 A | 4/1986 | Kull |
| 4,747,204 A | 5/1988 | Pratt et al. |
| 5,030,050 A | 7/1991 | Auriol |
| 5,816,761 A | 10/1998 | Cassatt et al. |
| 5,947,667 A | 9/1999 | Cassatt et al. |
| 6,247,883 B1 | 6/2001 | Monserratt |
| 7,033,120 B2 | 4/2006 | Hufnagl et al. |
| 7,658,582 B2 | 2/2010 | Doubler et al. |

OTHER PUBLICATIONS

Extended European Search Report, European Patent Office, dated Oct. 6, 2011 in related European Application No. 09755421.6.
Written Opinion from related application PCT/US2009/039083.
International Search Report from related application PCT/US2009/039083.

*Primary Examiner* — John C Hong
(74) *Attorney, Agent, or Firm* — Woodard, Emhardt, Moriarty, McNett & Henry LLP (57) ABSTRACT

A threaded blind fastener intended for installation in aerodynamically smooth or aesthetically critical panels, further adapted to minimize discontinuities on paintable surfaces of the head resulting from clearances between male and female threads that may adversely affect the quality of paint coverage.

28 Claims, 7 Drawing Sheets

FLUSH-MOUNT, BLIND FASTENER

This application is a continuation of International Application No. PCT/US2009/039083, filed Apr. 1, 2009 which claims the benefit of U.S. Provisional Application No. 61/041,739, filed Apr. 2, 2008.

FIELD OF THE INVENTION

The present invention relates to a threaded, flush-head, blind fastener constructed and arranged to produce an aerodynamic, paintable exposed head surface on the exterior surface of an aircraft.

BACKGROUND

Preferably, exterior aircraft surfaces should be aerodynamically smooth and aesthetically pleasing. Current (conventional) assembly processes typically utilize two-sided fasteners such as solid rivets, lock bolts with collars, and threaded pins with nuts. The manufactured heads of these installed fasteners are often positioned on the airflow surfaces of the aircraft. Their construction means that the exposed surface(s) can be easily painted with acceptable results because of the absence of head surface discontinuities.

Newer generation aircraft are to be assembled robotically, and it is not practical to install conventional two-sided fasteners such as solid rivets, lock bolts and threaded pins with this type of equipment. The primary issue with robotic assembly is the equipment cost and programming coordination. The requisite equipment is essentially doubled due to requiring equipment on each side so as to have access to each end of the fastener. Further, the timing and synchronization of the equipment on one side has to be coordinated with the timing and synchronization of the equipment on the opposite side. As a result, a need exists for blind (one-sided) fasteners that are easily installed with a robot, and optionally shaved, but also leave a flaw free head surface that may be painted with a good quality finish.

There are many types of blind fasteners presently available for assembly of aircraft structures and components, but these fasteners have drawbacks that make their use in many of the painted aerodynamic applications that are emerging less than optimal. Mechanically-locked pull-type blind rivets generally fail to provide sufficient joint strength. Mechanically-locked pull-type blind bolts, as disclosed in U.S. Pat. No. 4,127,345, issued Nov. 28, 1978 to Angelosanto et al., and rivets, as disclosed in U.S. Pat. No. 5,378,098, issued Jan. 3, 1995 to Andrews et al., typically incorporate a locking ring in the manufactured head that must not be shaved smooth, lest the structural integrity of the fastener would be adversely affected. Threaded blind bolts, as disclosed in U.S. Pat. No. 4,457,652, issued Jul. 3, 1984 to Pratt, may have sufficient strength but leave a small discontinuity on the head surface after shaving, resulting from gaps between male and females threads. The concern over having a discontinuity of this type is that the negative aesthetics are exaggerated by the application of paint. This discontinuity arises from small, but necessary, clearances between the female and male threads of the fastener.

SUMMARY

The present disclosure relates to a threaded blind fastener comprising a body, a core bolt, and a sleeve. A disposable drive nut may be used to facilitate installation and a plastic insert may be incorporated to assist in formation of the blind head.

One object of the present disclosure is to describe an improved flush-mount, blind fastener.

DETAILED DESCRIPTION

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates. In several figures, where there are the same or similar elements, those elements are designated with the same or similar reference numerals.

Figure 1:
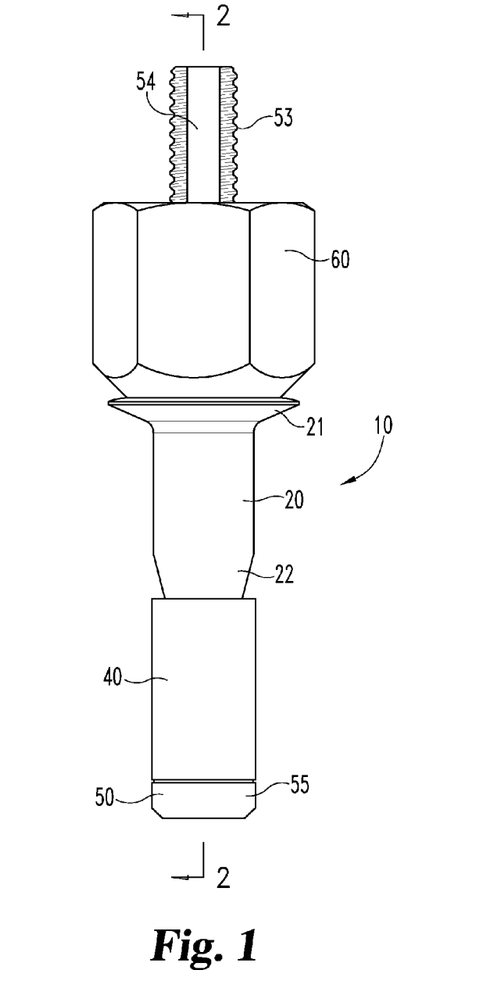
FIG. 1 is a front elevational view of a blind fastener, as initially supplied, according to the present disclosure.
Figure 2:
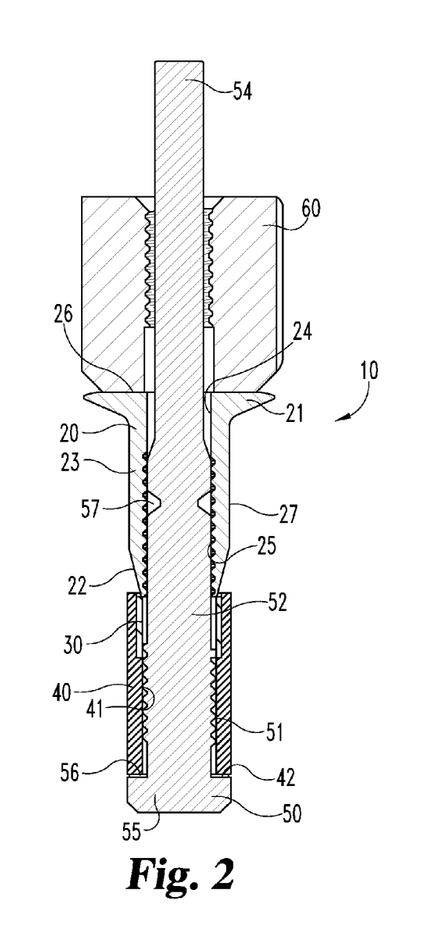
FIG. 2 is a front elevational view, in full section, of the FIG. 1 blind fastener, as viewed along line 2-2 in FIG. 1.

Referring to FIGS. 1 and 2, there is illustrated a flush-mount, blind fastener 10 that is constructed and arranged according to the following disclosure. Blind fastener 10 includes body 20, deformable sleeve 40, core bolt 50, and a drive nut 60. The body 20 includes an enlarged, frustoconical head 21 at one end, a conical nose 22 at the opposite end, a generally cylindrical shank 23, a through bore 24, and a threaded bore 25. The deformable sleeve 40 defines a through bore 41. The core bolt 50 includes an enlarged head 55 at one end, a wrenching region 54 at the opposite end, primary threads 51, secondary threads 53, and a generally cylindrical unthreaded shank 52. An optional plastic insert 30 is included as a way to assist in formation of the blind head end during installation. The functioning of such an insert 30 is described in U.S. Pat. No. 4,457,652.

The enlarged head 21 has a frustoconical shape that is constructed and arranged to correspond to the countersink shape in the outer workpiece 70*a*. The upper surface 26 is slightly domed (convex), or raised, the function of which will be described hereinafter. The interior bore 24 is a cylindrical form that is sized for a close fit around the (unthreaded) cylindrical shank 52.

The enlarged head 55 of the core bolt 50 includes a horizontal shoulder 56 that seats (i.e., abuts against) the lower end 42 of deformable sleeve 40. Accordingly, as bolt 50 is drawn upwardly, the sleeve 40 is pulled up the outer surface 27 of body 20 starting with the conical nose 22. The shank 52 is positioned between the upper and lower sets of threads, the secondary threads 53 and primary threads 51, respectively.

Formed in shank 52 is an annular groove 57 that creates a weakened location for separation of the core bolt 50, as will be described. The drive nut 60 is assembled into threaded engagement with the (upper) secondary threads 53. This is essentially what is illustrated in FIGS. 1 and 2.

Figure 3:
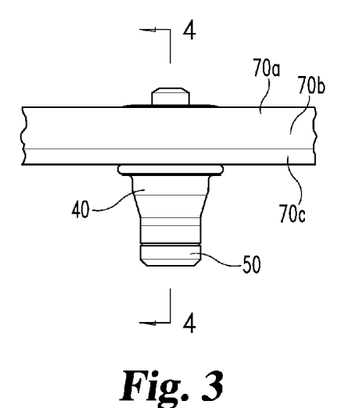
FIG. 3 is a front elevational view of the FIG. 1 blind fastener, as installed, prior to finishing.
Figure 4:
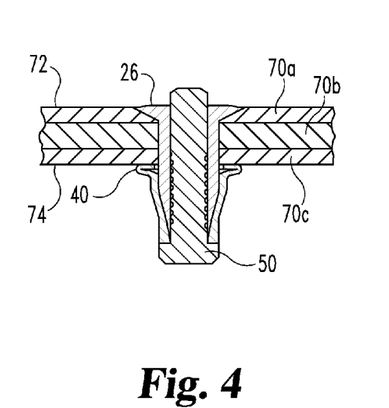
FIG. 4 is a front elevational view, in full section, of the FIG. 3 installed blind fastener, as viewed along line 4-4 in FIG. 3.

Referring to FIGS. 3 and 4, the fastener 10 is installed through a plurality of workpieces 70*a*, 70*b*, and 70*c*. While three workpiece layers (laminations) are illustrated, it will be understood that a lesser number (2) or a greater number can be secured together by fastener 10 as described and illustrated herein. The referenced workpieces 70*a*-70*c* are composite laminations consistent with what would be expected or anticipated for the aircraft industry, but could also be metal panels or workpieces. The form of fastener 10 in FIGS. 3 and 4 is after the initial installation steps as further described hereinafter.

The preparation of the workpieces 70*a*-70*c* for receipt of blind fastener 10 includes first drilling a cylindrical bore 71 through the three workpieces and then finishing the outer surface 72 of the outer workpiece 70*a* with a concentric countersink 73. Into this prepared aperture, the fastener 10 is installed such that head 55 extends beyond the blind side surface 74 of workpiece 70*c* with the enlarged, frustoconical head 21 seated into the countersink 73.

The installation of FIGS. 3 and 4 is accomplished by rotationally threading the core bolt 50 into drive nut 60, with the enlarged head 55 of core bolt 50 forcing the deformable sleeve 40 up the conical nose 22 of body 20. If not initially in threaded engagement, the primary core bolt threads 51 and body threads 25 come into engagement during the early stages of the installation cycle. The workpieces 70*a*-70*c* become tightly clamped as the deformable sleeve 40 comes to bear against blind side surface 73, whereupon the wrenching region 54 separates from the core bolt at groove 57 as the torsion strength of the core bolt material is exceeded. The movement of sleeve 40 into this bulbed configuration may be facilitated by plastic insert 30. These actions and interactions relative to sleeve 40 and insert 30 are further explained in part in U.S. Pat. No. 4,457,652.

Figure 5:
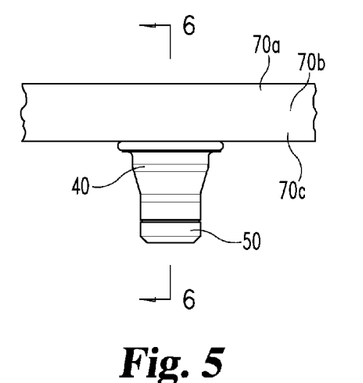
FIG. 5 is a front elevational view of the FIG. 3 installed blind fastener, as finished.
Figure 6:
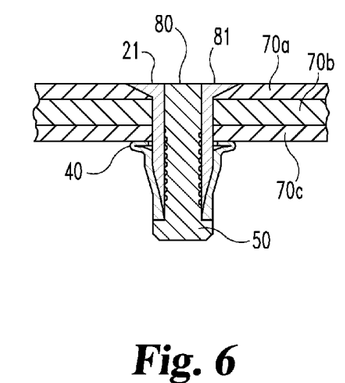
FIG. 6 is a front elevational view, in full section, of the FIG. 5 finished installation of the blind fastener, as viewed along line 6-6 in FIG. 5.
Figure 7:
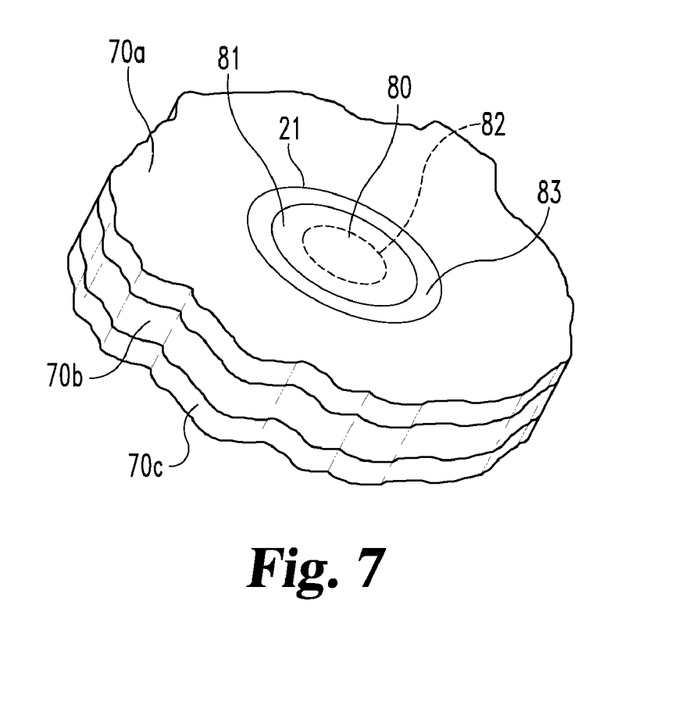
FIG. 7 is a partial, perspective view of the FIG. 5 finished installation.

Referring now to FIGS. 5 and 6, it is noted that, after installation, the exposed upper surface 26 on head 21 of the body 20 is shaved substantially flush with the outer surface 72 of workpiece 70*a* to provide an aerodynamically-smooth surface 81. Raised portions of core bolt 50 are also removed during this shaving step to provide flush head 80. The enlarged head 21 of the body 20 is provided with a dome of excess material defined by surface 26 for shaving to avoid having to weaken the fastener 10 by excessive material removal. Further, the fastener body may be colored or dyed such that, after shaving flush the enlarged head 21, a band 83 of color on the periphery of the exposed head is left (see FIG. 7). This annular ring of color serves as an indicator as to how much safely removable material remains.

One of the considerations in shaving off material to create a flush finish is that the fastener not be weakened by removing too much material. When an annular ring of color or surface finish is left, this can be visually inspected as a way to confirm that the fastener 10 has not been weakened, due to excess material removal. Further, since the shank 52 is sized to be a close fit, ideally line-to-line, with bore 24, there is only a negligible discontinuity 82 at most between the core bolt 50 and the shaved head surface 21. Accordingly, in those applications where the fastener is to be painted, this negligible discontinuity 82 is not exaggerated by the application of paint. The result is an aesthetically pleasing, flush-mounted, paintable blind fastener that is suitable for aircraft applications and robotic installation.

Figure 8:
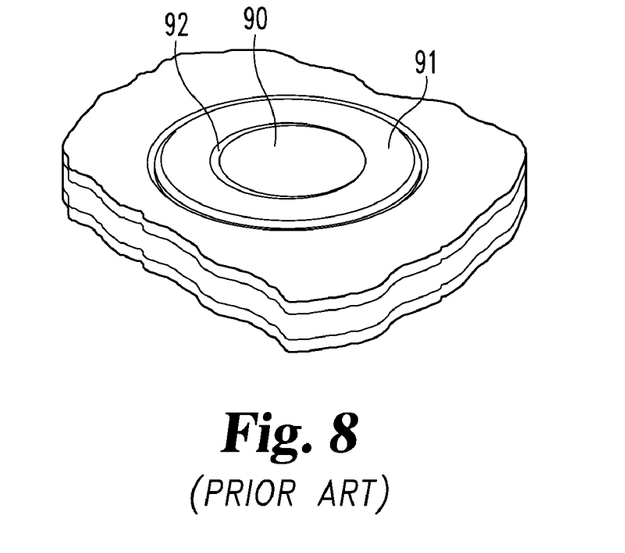
FIG. 8 is a prior art structure that includes a discontinuity ring.

In comparison, the prior art construction of FIG. 8 illustrates the use of a screw 90 and a fastener body 91 that are threaded together. This specific assembly style results in a discontinuity gap 92 between the mating threads that is of a size or magnitude that results in an aesthetically unattractive combination. Due to thread geometry factors such as thread angle and pitch, and due to the realities of threaded engagement, the discontinuity gap 92 gradually becomes smaller as it extends from its maximum to its minimum 180 degrees apart. Even when this gap or discontinuity is relatively small, the addition of paint visually exaggerates the magnitude of the discontinuity. The result is an unacceptable visual appearance that is the result of using this prior art style of blind fastener. The need to use blind fasteners has been explained relative to the realities of robotic installation. Consequently, the fastener disclosed in FIGS. 1-7 provides an improvement over the prior art structures.

Figure 9:
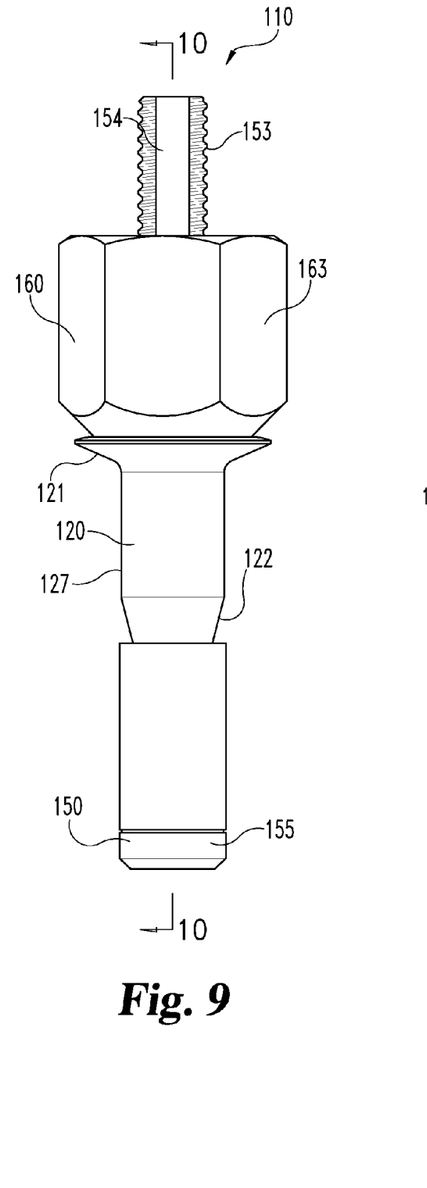
FIG. 9 is a front elevational view of a blind fastener, as initially supplied, according to the present disclosure.
Figure 10:
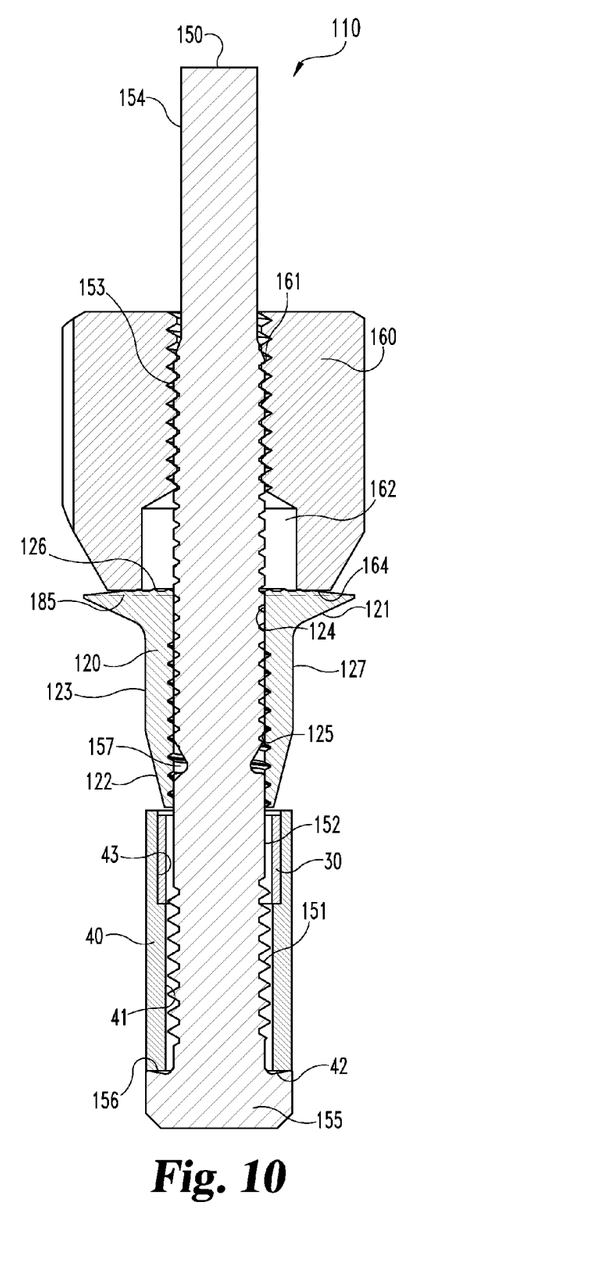
FIG. 10 is a side elevational view, in full section, of the FIG. 9 blind fastener, as viewed along line 10-10 in FIG. 9.
Figure 11:
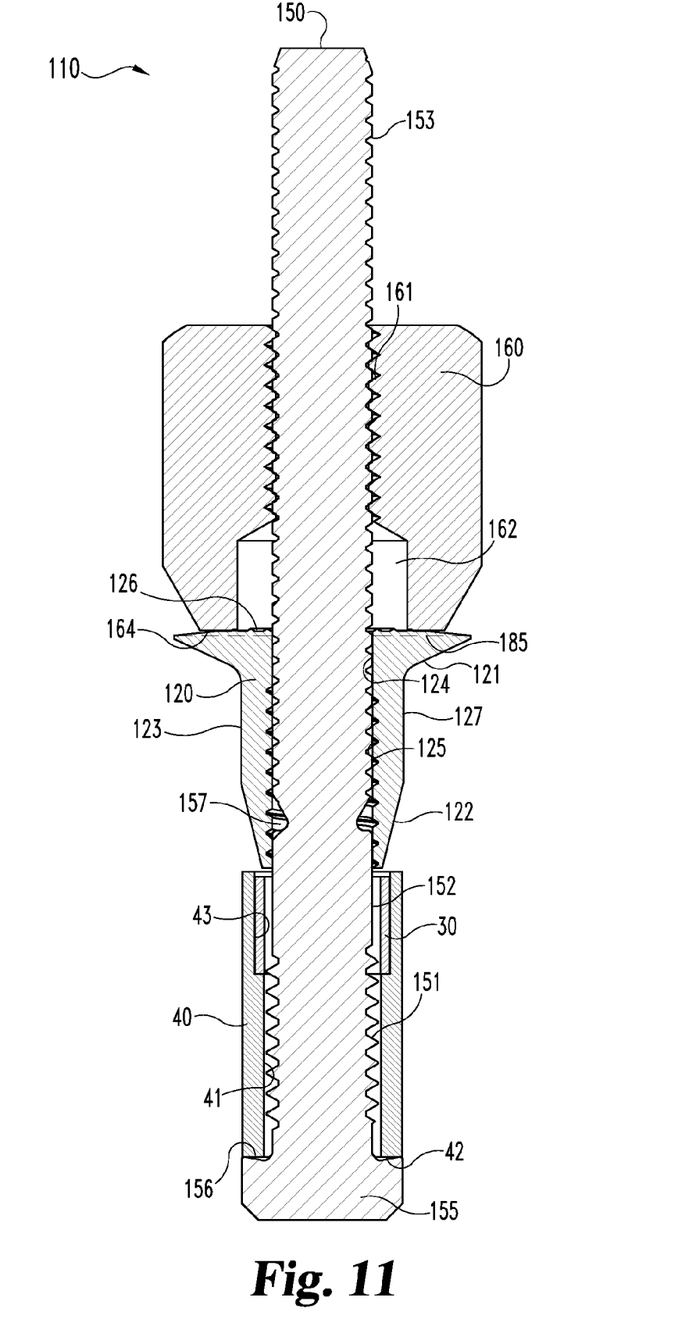
FIG. 11 is a front elevational view, in full section, of the FIG. 9 blind fastener.

Referring to FIGS. 9-11, blind fastener 110 is illustrated as constructed and arranged as follows. Blind fastener 110 includes body 120, deformable sleeve 40, core bolt 150 and drive nut 160. Body 120 includes enlarged frustoconical head 121 at one end and conical nose 122 at the opposite end, a generally cylindrical shank 123 and through bore 124 and threaded bore 125. Threaded bore 125 is an internal thread with crest truncation to the pitch diameter. Upper surface 126 defines the top of head 121 and body 120 includes outer surface 127.

Core bolt 150 includes enlarged head 155 at one end, wrenching portion 154 at the opposite end, first threaded portion 151, second threaded portion 153 and a generally cylindrical smooth wall shank 152. First threaded portion 151 is an externally threaded portion with full threads illustrated. However, in alternative embodiments, the root of the thread could be truncated to the pitch diameter. The second threaded portion 153 is externally threaded with crest truncation to the pitch diameter.

Similar to the embodiment illustrated in FIGS. 1-2, plastic insert 30 is optionally included in thin walled recess 43 as a way to assist in the formation of the blind head end during installation. The characteristics and function of insert 30 is described in U.S. Pat. No. 4,457,652.

Drive nut 160 includes internally threaded portion 161, unthreaded recess 162, wrenching flats 163 and nose 164. Internally threaded portion 161 is illustrated with full threads; however, alternative embodiments could utilize the threads with root truncation to the pitch diameter. Unthreaded recess 162 provides a space in which annular groove 157 can fracture after installation separating a top portion of core bolt 150 and drive nut 160 to be removed from the installed blind fastener 110. Nose 164 engages upper surface 126 in a frictional engagement that rotationally constrains drive nut 160 with body 120 during installation. Nose 164 and/or upper surface 126 may optionally include friction enhancing features such as knurling or small projections to better engage drive nut 160 with body 120.

Figure 14:
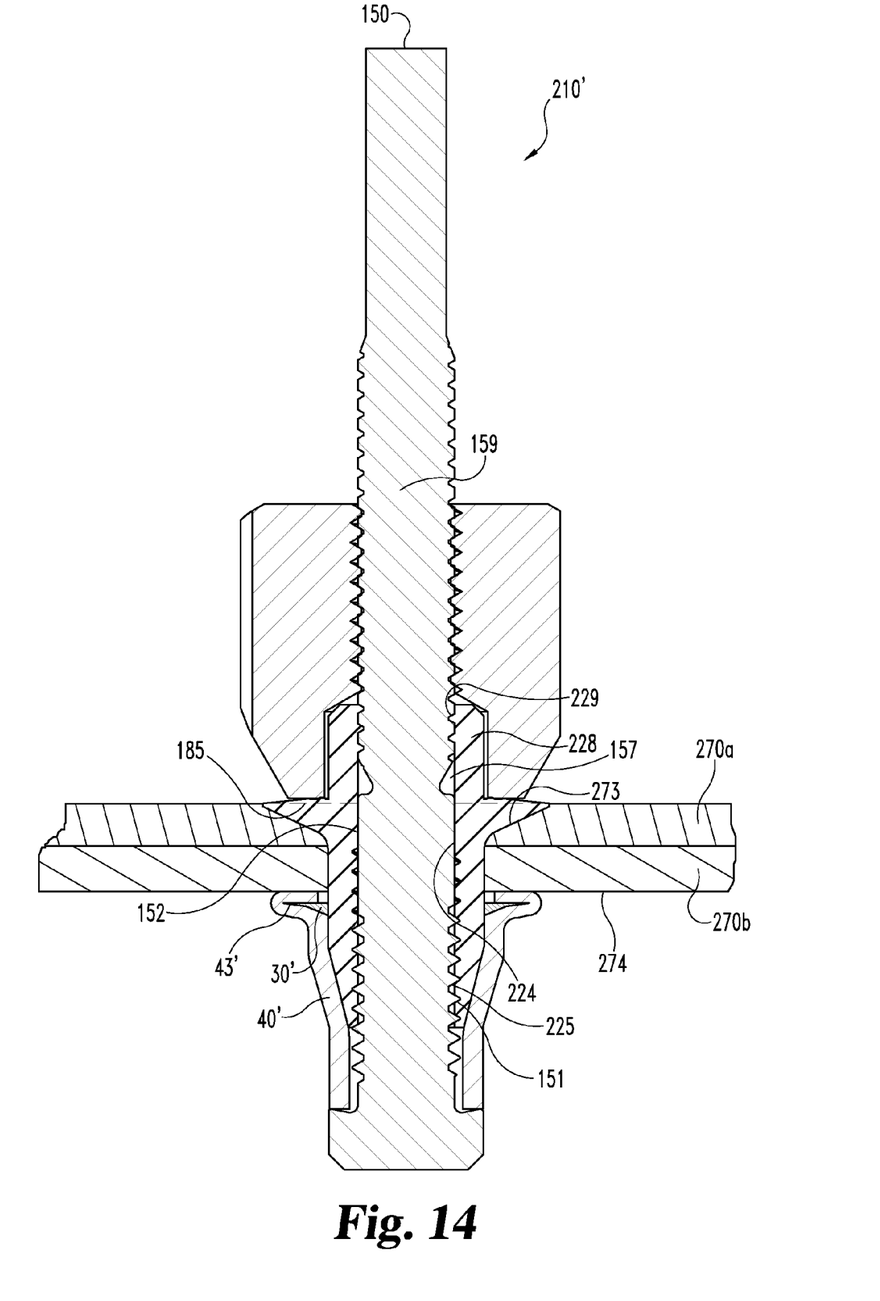
FIG. 14 is a front elevational view, in full section, of the FIG. 12 blind fastener in an intermediate installed position.

Body 120 includes enlarged head 121 having a frustoconical shape that is constructed and arranged to correspond to a counter sunk recess in a work piece. Upper surface 126 is slightly domed (convex) or raised above machining line 185 that represents a location where body 120 can be machined flush with the outer surface of the work pieces. Threaded bore 125 is an internal thread with crest truncation to the pitch diameter. Threaded bore 125 and second threaded portion 153 are configured and arranged to not engage each another when body 120 is positioned over second threaded portion 153. Similarly, threaded bore 125 is configured and arranged to permit the passage of unthreaded shank 152 there through while threaded bore 125 is constructed and arranged to threadingly engage first threaded portion 151 as illustrated in FIG. 14. These fit characteristics can be obtained by using the same pitch diameter for first and second threaded portions 151 and 153 and threaded bore 125 with the illustrated root and crest truncations to the pitch diameter. In addition, the diameters of both unthreaded shank 152 and through bore 124 closely approximate the pitch diameter of the threaded portions.

Core bolt 150 includes horizontal shoulder 156 that is sloped at an angle, which in the illustrated embodiment is approximately 100° and in other embodiments the angle can be between 90° and 120°. In alternative embodiments (not illustrated), lower end 42 can be beveled to match the inclination of horizontal shoulder 156.

Figure 12:
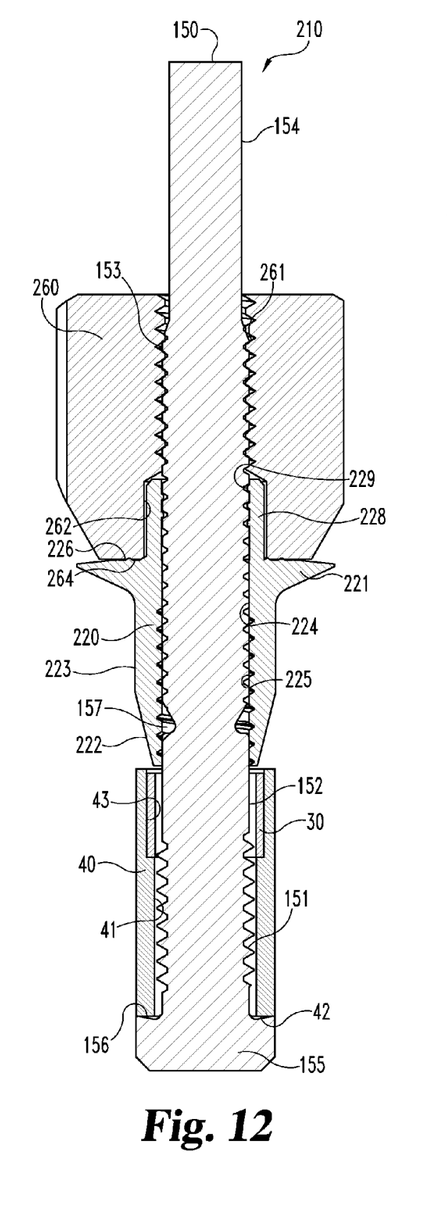
FIG. 12 is a front elevational view, in full section, of an alternative embodiment of blind fastener, as initially supplied.

Referring now to FIG. 12, an alternate embodiment is illustrated as blind fastener 210 that is constructed and arranged as follows. Blind fastener 210 includes body 220, deformable sleeve 40, core bolt 150 and drive nut 260. Body 220 includes enlarged head 221, nose 222, a generally cylindrical shank 223, smooth wall bore 224, internally threaded bore 225, upper surface 226, extension 228 extending therefrom and extension threads 229 on extension 228. Extension threads 229 include root truncation to the pitch diameter while internally threaded portion 225 has internal threads with crest truncation to the pitch diameter. As such, internally threaded portion 225 is constructed and arranged to not threadingly engage second threaded portion 153 while internally threaded portion 229 is constructed and arranged to threadingly engage second threaded portion 153. Smooth wall bore 224 extends through a portion of extension 228 with extension threads 229 positioned distally from upper surface 226. This configuration provides space for unthreaded smooth wall shank 152 to extend to or through upper surface 226 without interference from extension threads 229. Extension threads 229 keep threaded bore 225 rotationally aligned with first threaded portion 151 preventing cross threading when body 220 reaches first threaded portion 151 to become threadingly engaged with first threaded portion 151.

Drive nut 260 includes internally threaded portion 261, unthreaded recess 262 and nose 264. Unthreaded recess 262 is constructed and arranged to closely encapsulate extension 228 permitting extension 228 to have a relatively thin walled cross section that is supported by drive nut 260. Optionally, unthreaded recess 262 may have a near interference fit over extension 228.

Figure 13:
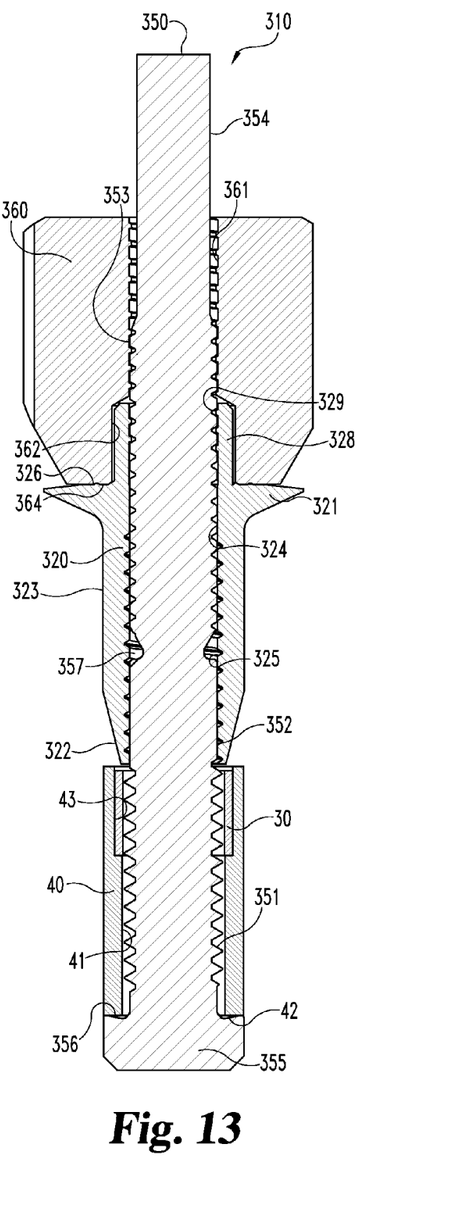
FIG. 13 is a front elevational view, in full section, of another alternative embodiment of blind fastener, as initially supplied.

Referring now to FIG. 13, an alternate embodiment is illustrated as blind fastener 310 that is constructed and arranged as follows. Blind fastener 310 includes body 320, deformable sleeve 40, core bolt 350 and drive nut 360.

Core bolt 350 is similar to core bolt 150 except for first threaded portion 351 being longer thereby moving smooth wall shank portion 352 further away from enlarged head 355 and similarly moving annular groove 357 further away from enlarged head 355.

Internally threaded portion 361 includes internal threads with root truncation to the pitch diameter as opposed to the full threads illustrated in other embodiments of the drive nut.

Blind fasteners 210 and 310 illustrate different embodiments for use in different ranges of work pieces stack height for the work pieces being clamped together. In practice, individual blind fastener configurations are utilized for limited thickness range with a total thickness that extends from a minimum to a maximum total work piece thickness. For example, in one embodiment the range between minimum and maximum thicknesses may be 0.050 of an inch (approximately 1.3 mm). Blind fasteners 210 and 310 illustrate configurations for different stack up heights. For example, blind fastener 210 illustrates configuration for a comparatively thinner work piece thickness. By way of comparison blind fastener 310 illustrates configuration for a comparatively thicker total stack up heights. In blind fastener 310 threaded bore 325 is within one revolution of beginning threading engagement with first threaded portion 351. In this embodiment, extension threads 329 still provide rotational guidance for body 20 as it engages first threaded portion 351 to prevent cross threading of threaded bore 325 on first threaded portion 351.

For yet other embodiments with thicker work pieces, threaded bore 325 could begin in engagement with first threaded portion 351 thereby assuring cross threaded situation does not exist permitting extension 328 and extension thread 329 to be optionally omitted.

Extensions 228 and 328 are removed with the top portion of the upper surface 226 and 326 during machining or "shaving" to provide a flush surface as described in other embodiments.

Referring now to FIG. 14, blind fastener 210' is illustrated in an intermediate installation configuration clamping work pieces 270a and 270b together with enlarged head 221 positioned in counter sunk recess 273. Blind fastener 210' corresponds to partially installed blind fastener 210 after clamping work pieces 270a and 270b together but before fracturing annealed annular groove 157. As shown, threaded bore 225 is threadingly engaged with first threaded portion 151 with deformable sleeve deformed forming a blind side head against blind surface 274 defined by deformed sleeve 40', in particular, thin wall recess 43' and plastic insert 30' as described in U.S. Pat. No. 4,457,652. In the illustrated configuration, smooth wall through bore 224 and smooth unthreaded shank 152 are aligned and smooth wall shank 152 is positioned in the region of machining line 185 with annular groove 157 positioned above machining line 185.

FIG. 14 illustrates blind fastener 210' clamping work pieces 270a and 270b together. Further tightening of core bolt 150 with respect to drive nut 260 will fracture annular groove 157, thereby separating removable portion 159 from the rest of core bolt 150 and fastener 210'. After fracturing annular groove 157, installation of fastener 210' is completed by the removal of removable portion 159 and drive nut and the removal of extension 228 and upper surface 126 to machine line 185 to create a flush finish as described above. The material removal to machine line 185 can be done by any material removal methods known, including, but not limited to, conventional milling, cutting, grinding. Such material removal methods are referred to as "shaving" above.

While the preferred embodiment of the invention has been illustrated and described in the drawings and foregoing description, the same is to be considered as illustrative and not restrictive in character, it being understood that all changes and modifications that come within the spirit of the invention are desired to be protected.

We claim:

1. A fastener for clamping work pieces together through aligned apertures, the work pieces including a front side and a blind surface, the fastener comprising:
a core bolt comprising a bolt head, a first externally threaded portion and an unthreaded shank portion;
a body positioned on the core bolt comprising an enlarged head, a first internally threaded portion, and a smooth wall through bore portion positioned proximate to the enlarged head; and
a deformable sleeve positioned on the core bolt between the bolt head and the body, wherein the fastener is constructed and arranged to be insertable through the aligned apertures from the front side, wherein the deformable sleeve expands over the body by rotating the core bolt causing threaded engagement between the first externally and first internally threaded portions and causing the deformable sleeve to bulb and form a bearing surface against the blind surface thereby clamping the work pieces together with the unthreaded shank portion aligned with the smooth wall through bore portion and wherein an outer diameter of the unthreaded shank portion of the core bolt is approximately equal to an inner diameter of the smooth wall through bore portion of the body permitting a close fit of the unthreaded shank portion in the smooth wall through bore portion.

2. The fastener of claim 1, further comprising a drive nut wherein the core bolt further comprises a second externally threaded portion in threaded engagement with the drive nut, wherein the drive nut is substantially rotationally constrained with the body.

3. The fastener of claim 1, wherein a pitch diameter of both the first externally threaded portion and the first internally threaded portion of the body is approximately equal to the diameter of the unthreaded shank portion of the core bolt and the smooth wall through bore portion of the body.

4. The fastener of claim 3, wherein the first internally threaded portion of the body comprises threads with crest truncation to the pitch diameter.

5. The fastener of claim 1, wherein the enlarged head of the body is constructed and arranged to fit in a counter sunk recess in the work pieces.

6. The fastener of claim 5, wherein the body further comprises a domed portion on the enlarged head that can be shaved off to be substantially flush with the work pieces.

7. The fastener of claim 6, wherein the domed portion is colored or dyed so that a band of color on the periphery of the domed portion remains after the enlarged head is shaved off.

8. The fastener of claim 1, wherein the core bolt further comprises an annular groove that is constructed and arranged to separate the core bolt into two sections after the work pieces are clamped together.

9. The fastener of claim 1, wherein the body further comprises an extension that extends from the enlarged head and a second internally threaded portion in the extension and wherein the core bolt further comprises a second externally threaded portion in threaded engagement with the extension.

10. The fastener of claim 9, wherein the smooth wall through bore portion extends through a portion of the extension.

11. The fastener of claim 9, wherein the pitch diameter of both the second externally threaded portion and the second internally threaded portion of the body is approximately equal to the diameter of the unthreaded shank portion and the smooth wall through bore portion.

12. The fastener of claim 9, further comprising a drive nut in threaded engagement with the second externally threaded portion, wherein the drive nut is substantially rotationally constrained with the body.

13. A method comprising:
inserting a blind fastener through aligned apertures of a plurality of work pieces, wherein the blind fastener comprises a core bolt including a bolt head, a first externally threaded portion and an unthreaded shank portion, a body positioned on the core bolt including an enlarged head, a first internally threaded portion and a smooth wall through bore portion positioned proximate to the enlarged head, and a deformable sleeve positioned on the core bolt between the bolt head and the body, wherein an outer diameter of the unthreaded shank portion of the core bolt is approximately equal to an inner diameter of the smooth wall through bore portion of the body permitting a close fit of the unthreaded shank portion in the smooth wall through bore portion; and
rotating the core bolt with respect to the body thereby expanding the deformable sleeve over the body causing threaded engagement between the first externally and first internally threaded portions and causing the deformable sleeve to bulb and form a bearing surface against a blind surface of the work pieces to clamp the work pieces together and aligning the unthreaded shank portion with the smooth wall through bore portion.

14. A method comprising:
inserting a blind fastener through aligned apertures of a plurality of work pieces, wherein the blind fastener comprises a core bolt including a bolt head, a first externally threaded portion and an unthreaded shank portion, a body positioned on the core bolt including an enlarged head, a first internally threaded portion and a smooth wall through bore portion positioned proximate to the enlarged head, and a deformable sleeve positioned on the core bolt between the bolt head and the body;
rotating the core bolt with respect to the body thereby expanding the deformable sleeve over the body causing threaded engagement between the first externally and first internally threaded portions and causing the deformable sleeve to bulb and form a bearing surface against a blind surface of the work pieces to clamp the work pieces together and aligning the unthreaded shank portion with the smooth wall through bore portion; and
shaving the blind fastener substantially flush with an outer surface of the work pieces, wherein the shaving removes a portion of the unthreaded shank portion and a portion of the smooth wall through bore portion leaving a close fit therebetween.

15. The method of claim 14, further comprising: inspecting a band of color on the shaved head of the blind fastener to confirm that excessive material was not removed during the shaving act.

16. A fastener for clamping work pieces together through aligned apertures, the work pieces including a front side, a counter sunk recess on the front side and a blind surface, the fastener comprising:
a core bolt comprising a bolt head, a first externally threaded portion threaded at a pitch diameter, a second externally threaded portion threaded at the pitch diameter with crest truncation approximately to the pitch diameter and an unthreaded shank portion with a shank diameter approximately equal to the pitch diameter positioned between the first and second externally threaded portions;

a body positioned on the core bolt comprising an enlarged head constructed and arranged to fit in the counter sunk recess, a first internally threaded portion threaded at the pitch diameter with crest truncation approximately to the pitch diameter, and a smooth wall through bore portion with a bore diameter approximately equal to the pitch diameter positioned proximate to the enlarged head; and a deformable sleeve positioned on the core bolt between the bolt head and the body, wherein the fastener is constructed and arranged to be insertable through the aligned apertures from the front side, wherein the deformable sleeve expands over the body by rotating the core bolt relative to the body causing threaded engagement between the first externally and first internally threaded portions and causing the deformable sleeve to bulb and form a bearing surface against the blind surface thereby clamping the work pieces together with the unthreaded shank portion aligned with the smooth wall through bore portion.

17. The fastener of claim 16, wherein the body further comprises an extension that extends from the enlarged head and a second internally threaded portion threaded at the pitch diameter positioned within the extension.

18. The fastener of claim 16, further comprising a drive nut in threaded engagement with the second externally threaded portion, wherein the drive nut is substantially rotationally constrained with the body.

19. A fastener for clamping work pieces together through aligned apertures, the work pieces including a front side and a blind surface, the fastener comprising:
    a core bolt comprising a bolt head, a first externally threaded portion and an unthreaded shank portion;
    a body positioned on the core bolt comprising an enlarged head, a first internally threaded portion, and a smooth wall through bore portion positioned proximate to the enlarged head; and
    a deformable sleeve positioned on the core bolt between the bolt head and the body, wherein the fastener is constructed and arranged to be insertable through the aligned apertures from the front side, wherein the deformable sleeve expands over the body by rotating the core bolt causing threaded engagement between the first externally and first internally threaded portions and causing the deformable sleeve to bulb and form a bearing surface against the blind surface thereby clamping the work pieces together with the unthreaded shank portion aligned with the smooth wall through bore portion and wherein the enlarged head of the body is constructed and arranged to fit in a counter sunk recess in the work pieces.

20. The fastener of claim 19, wherein the body further comprises a domed portion on the enlarged head that can be shaved off to be substantially flush with the work pieces.

21. The fastener of claim 20, wherein the domed portion is colored or dyed so that a band of color on the periphery of the domed portion remains after the enlarged head is shaved off.

22. The fastener of claim 19, wherein the body further comprises an extension that extends from the enlarged head and a second internally threaded portion in the extension and wherein the core bolt further comprises a second externally threaded portion in threaded engagement with the extension.

23. A fastener for clamping work pieces together through aligned apertures, the work pieces including a front side and a blind surface, the fastener comprising:
    a core bolt comprising a bolt head, a first externally threaded portion and an unthreaded shank portion;
    a body positioned on the core bolt comprising an enlarged head, a first internally threaded portion, and a smooth wall through bore portion positioned proximate to the enlarged head; and
    a deformable sleeve positioned on the core bolt between the bolt head and the body, wherein the fastener is constructed and arranged to be insertable through the aligned apertures from the front side, wherein the deformable sleeve expands over the body by rotating the core bolt causing threaded engagement between the first externally and first internally threaded portions and causing the deformable sleeve to bulb and form a bearing surface against the blind surface thereby clamping the work pieces together with the unthreaded shank portion aligned with the smooth wall through bore portion and wherein the body further comprises an extension that extends from the enlarged head and a second internally threaded portion in the extension and wherein the core bolt further comprises a second externally threaded portion in threaded engagement with the extension.

24. The fastener of claim 23, wherein the smooth wall through bore portion extends through a portion of the extension.

25. The fastener of claim 23, wherein the pitch diameter of both the second externally threaded portion and the second internally threaded portion of the body is approximately equal to the diameter of the unthreaded shank portion and the smooth wall through bore portion.

26. A fastener for clamping work pieces together through aligned apertures, the work pieces including a front side and a blind surface, the fastener comprising:
    a core bolt comprising a bolt head, a first externally threaded portion and an unthreaded shank portion;
    a body positioned on the core bolt comprising an enlarged head, a first internally threaded portion, and a smooth wall through bore portion positioned proximate to the enlarged head; and
    a deformable sleeve positioned on the core bolt between the bolt head and the body, wherein the fastener is constructed and arranged to be insertable through the aligned apertures from the front side, wherein the deformable sleeve expands over the body by rotating the core bolt causing threaded engagement between the first externally and first internally threaded portions and causing the deformable sleeve to bulb and form a bearing surface against the blind surface thereby clamping the work pieces together with the unthreaded shank portion aligned with the smooth wall through bore portion and wherein a pitch diameter of both the first externally threaded portion and the first internally threaded portion of the body is approximately equal to the diameter of the unthreaded shank portion of the core bolt and the smooth wall through bore portion of the body.

27. The fastener of claim 26, wherein the first internally threaded portion of the body comprises threads with crest truncation to the pitch diameter.

28. The fastener of claim 26, wherein the core bolt further comprises an annular groove that is constructed and arranged to separate the core bolt into two sections after the work pieces are clamped together.

* * * * *